US012056058B2

(12) United States Patent
Tune et al.

(10) Patent No.: US 12,056,058 B2
(45) Date of Patent: Aug. 6, 2024

(54) CACHE REPLACEMENT CONTROL

(71) Applicant: Arm Limited, Cambridge (GB)

(72) Inventors: Andrew David Tune, Dronfield (GB);
Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 37 days.

(21) Appl. No.: 17/850,072

(22) Filed: Jun. 27, 2022

(65) Prior Publication Data

US 2023/0418765 A1    Dec. 28, 2023

(51) Int. Cl.
*G06F 12/121*    (2016.01)
*G06F 12/06*    (2006.01)
*G06F 12/0891*    (2016.01)

(52) U.S. Cl.
CPC ........ G06F 12/121 (2013.01); G06F 12/0646 (2013.01); G06F 12/0891 (2013.01)

(58) Field of Classification Search
CPC .... G06F 12/121; G06F 12/12; G06F 12/0646; G06F 12/08; G06F 12/0891
See application file for complete search history.

(56) References Cited

U.S. PATENT DOCUMENTS

| 10,394,454 | B2 | 8/2019 | Krueger | |
| 11,604,733 | B1* | 3/2023 | Krueger | G06F 12/0864 |
| 2017/0293571 | A1* | 10/2017 | Al Sheikh | G06F 12/127 |
| 2017/0357588 | A1* | 12/2017 | Moyer | G06F 12/0866 |
| 2017/0357596 | A1* | 12/2017 | Moyer | G06F 12/0888 |
| 2019/0138449 | A1* | 5/2019 | Tian | G06F 12/0811 |

(Continued)

FOREIGN PATENT DOCUMENTS

| EP | 3 258 382 | 12/2017 | |
| WO | WO-2017218026 A1 * | 12/2017 | G06F 12/0811 |

OTHER PUBLICATIONS

X. Zhang, C. Li, H. Wang and D. Wang, "A Cache Replacement Policy Using Adaptive Insertion and Re-reference Prediction," 2010 22nd International Symposium on Computer Architecture and High Performance Computing, Petropolis, Brazil, 2010, pp. 95-102.*

(Continued)

*Primary Examiner* — Pierre Michel Bataille
(74) *Attorney, Agent, or Firm* — NIXON & VANDERHYE P.C.

(57) ABSTRACT

An apparatus comprises a cache comprising a plurality of cache entries, and cache replacement control circuitry to select, in response to a cache request specifying a target address missing in the cache, a victim cache entry to be replaced with a new cache entry. The cache request specifies a partition identifier indicative of an execution environment associated with the cache request. The victim cache entry is selected based on re-reference interval prediction (RRIP) values for a candidate set of cache entries. The RRIP value for a given cache entry is indicative of a relative priority with which the given cache entry is to be selected as the victim cache entry. Configurable replacement policy configuration data is selected based on the partition identifier, and the RRIP value of the new cache entry is set to an initial value selected based on the selected configurable replacement policy configuration data.

20 Claims, 7 Drawing Sheets

(56) References Cited

U.S. PATENT DOCUMENTS

2020/0409856 A1* 12/2020 Navon ................... G06F 12/123
2021/0109861 A1*  4/2021 Yin ...................... G06F 12/0855
2022/0374367 A1* 11/2022 Fang ...................... G06N 20/00
2022/0413866 A1* 12/2022 Nathella ............. G06F 9/30047
2023/0102891 A1*  3/2023 Moyer .................. G06F 12/123
                                                            711/118

OTHER PUBLICATIONS

Jaleel et al., "High Performance Cache Replacement Using Re-Reference Interval Prediction (RRIP)" ISCA'10, Jun. 19-23, 2010, 12 pages.*

Jaleel, A. et al. "High Performance Cache Replacement Using Re-Reference Interval Prediction (RRIP)" ISCA'10, Jun. 19-23, 2010 (12 pages).

Qureshi, M. et al., "Adaptive Insertion Policies for High Performance Caching" ISCA'07, Jun. 9-13, 2007 (11 pages).

Sridharan, A. et al. Dynamic and Discrete Cache Insertion Policies for Managing Shared Last Level Caches in Large Mulitcores. Journal of Parallel and Distributed Computing, Elsevier, May 9, 2017, 106, pp. 215-226. (25 pages).

Lin, W. et al. "Reducing DRAM Latencies with an Integrated Memory Hierarchy Design" 7th International Symposium on High-Performance Computer Architecture, Jan. 2001 (12 pages).

"Arm® Architecture Reference Manual Supplement, Memory System Resource Partitioning and Monitoring (MPAM), for A-profile architecture" Arm Limited, 2018-2021 (410 pages).

J. Tada, "A Cache Replacement Policy with Considering Global Fluctuations of Priority Values" 2018 Sixth International Symposium on Computing and Networking Workshops (CANDARW), Takayama, Japan, Nov. 27, 2018, pp. 161-170.

H. Jin et al., "Miss Penalty Aware Cache Replacement for Hybrid Memory Systems" IEEE Transactions on Computer-Aided Design of Integrated Circuits and Systems, vol. 39, No. 12, Jan. 13, 2020, 14 pages.

* cited by examiner

| | | | |
|---|---|---|---|
| 84 | SLCCFG_RRIP_HP_VAL | 2'bit | For SLC Hit the RRPV value to be inserted for the way with hit when HP mode is used. Default : 0 |
| 82 | SLCCFG_RRIP_MODE | 1-bit | 1'b1 : select FP mode where for Hit the RRPV value is decremented from current value<br>1'b0 : select HP mode, constant value from SLCCFG_RRIP_HP_VAL register<br>Default : 1'b1<br><br>This control register choses between the Hit Priority and Frequency Priority |
| 86 | SLCCFG_SRRIP_VAL | 2-bit | SRRIP RRIPV Value<br>Default : 2'b10 |
| 88 | SLCCFG_BRRIP_VAL_1 | 2-bit | BRRIP RRPV Value used 1/32 times<br>Default : 2'b10 |
| 90 | SLCCFG_BRRIP_VAL_0 | 2-bit | BRRIP RRPV Value used 31/32 times<br>Default : 2'b11 |
| 80 | SLCCFG_PRRIP_SEL | 1-bit | indicating the Mode selected for the PartID<br>0 – SRRIP Mode<br>1 – BRRIP Mode<br>Default - 1'b0 |
| 92 | SLCCFG_RRIP_HIGHER-CACHE_RRIP_INPUT | 1-bit | indicate whether to use RRIPV from higher-level cache if available<br>0 – ignore RRIPV from higher-level cache<br>1 – if available, use RRIPV from higher-level cache to initialize RRIPV for new allocated entry<br><br>Default – 1'b0 |

CACHE REPLACEMENT CONTROL

BACKGROUND

Technical Field

The present technique relates to the field of data processing. More particularly, it relates to cache replacement control.

Technical Background

A data processing system may have a cache to cache information (e.g. data or instructions) for memory addresses predicted to be accessed in future. In response to a cache request, a lookup is performed in the cache to detect whether the cache stores information associated with a target address specified by the cache request. If the cache request hits in the cache, the information can be accessed faster than when a miss occurs and the information is obtained from a further level of cache or from memory. If a cache request misses in the cache, a new cache entry can be allocated for the information associated with the target address. If there is no invalid entry available for allocation as the new cache entry, a victim cache entry can be selected to be replaced with the new entry. A cache replacement policy may be used to control selection of which entry is the victim cache entry.

SUMMARY

At least some examples of the present technique provide an apparatus comprising:
  a cache comprising a plurality of cache entries; and
  cache replacement control circuitry to select, in response to a cache request specifying a target address missing in the cache, a victim cache entry to be replaced with a new cache entry, the cache request specifying a partition identifier indicative of an execution environment associated with the cache request; in which:
  the cache replacement control circuitry is configured to:
    select the victim cache entry based on re-reference interval prediction (RRIP) values for a candidate set of cache entries, the RRIP value for a given cache entry being indicative of a relative priority with which the given cache entry is to be selected as the victim cache entry;
    select, based on the partition identifier specified by the cache request, configurable replacement policy configuration data associated with the partition identifier; and
    set the RRIP value of the new cache entry to an initial value selected based on the selected configurable replacement policy configuration data associated with the partition identifier.

At least some examples of the present technique provide a method comprising:
  in response to a cache request specifying a target address missing in the cache, selecting a victim cache entry to be replaced with a new cache entry, the cache request specifying a partition identifier indicative of an execution environment associated with the cache request, and the victim cache entry being selected based on re-reference interval prediction (RRIP) values for a candidate set of cache entries, the RRIP value for a given cache entry being indicative of a relative priority with which the given cache entry is to be selected as the victim cache entry;
  selecting, based on the partition identifier specified by the cache request, configurable replacement policy configuration data associated with the partition identifier; and
  setting the RRIP value of the new cache entry to an initial value selected based on the selected configurable replacement policy configuration data associated with the partition identifier.

At least some examples of the present technique provide a non-transitory computer-readable medium to store computer-readable code for fabrication of an apparatus comprising:
  a cache comprising a plurality of cache entries; and
  cache replacement control circuitry to select, in response to a cache request specifying a target address missing in the cache, a victim cache entry to be replaced with a new cache entry, the cache request specifying a partition identifier indicative of an execution environment associated with the cache request; in which:
  the cache replacement control circuitry is configured to:
    select the victim cache entry based on re-reference interval prediction (RRIP) values for a candidate set of cache entries, the RRIP value for a given cache entry being indicative of a relative priority with which the given cache entry is to be selected as the victim cache entry;
    select, based on the partition identifier specified by the cache request, configurable replacement policy configuration data associated with the partition identifier; and
    set the RRIP value of the new cache entry to an initial value selected based on the selected configurable replacement policy configuration data associated with the partition identifier.

Further aspects, features and advantages of the present technique will be apparent from the following description of examples, which is to be read in conjunction with the accompanying drawings.

BRIEF DESCRIPTION OF THE DRAWINGS

FIG. 5 illustrates a number of examples of configurable replacement policy configuration data which can be specified for a given partition identifier to influence the way in which RRIP values are used for controlling cache replacement;

DESCRIPTION OF EXAMPLES

Figure 1:
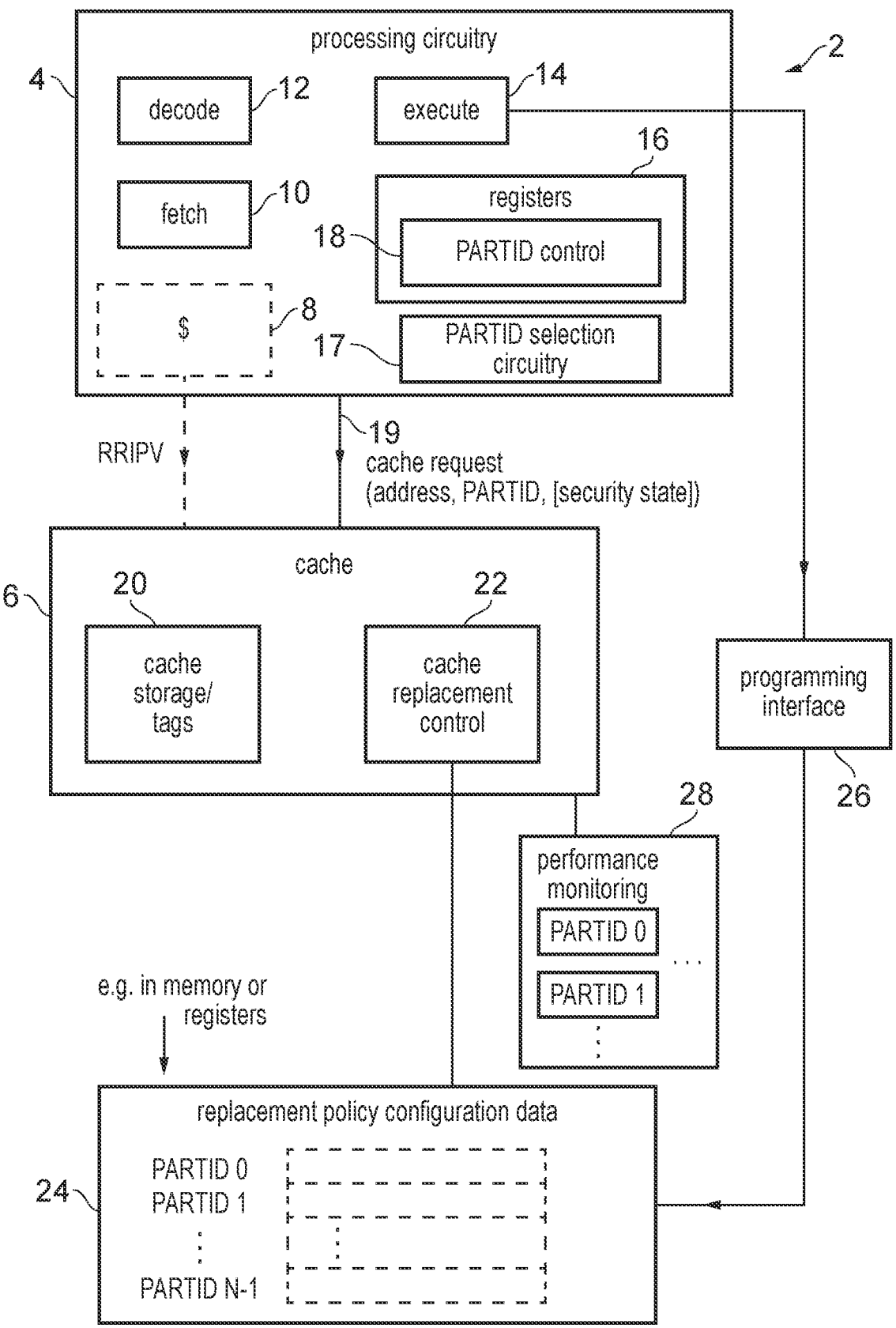
FIG. 1 illustrates an example of a data processing apparatus having a cache.

An apparatus may have a cache comprising a number of cache entries, and cache replacement control circuitry to select, in response to a cache request specifying a target address missing in the cache, a victim cache entry to be replaced with a new cache entry. A cache replacement policy may be used to determine which cache entry to select as the victim cache entry. A wide variety of cache replacement policies are available.

One approach for designing cache replacement control circuitry can be to implement a single cache replacement policy used for handling all cache requests. For such a system, the hardware may not support any ability to change which policies used. However, such an inflexible implementation may suffer from reduced performance because different execution environments (e.g. hardware units capable of issuing memory access requests, and/or software processing workloads) may exhibit different patterns of address accesses which benefit from different cache replacement policies. A cache replacement policy that works well for one execution environment may not work well for another workload.

Another approach can be to provide "set-duelling" hardware which uses a first replacement policy for a first group of sets of entries in a set-associative cache, uses a second replacement policy for a second group of sets of entries, and monitors cache hit rate or other performance indicators for the first and second groups of sets, to determine which of the first and second replacement policies is performing better. The better-performing replacement policy is then used for remaining sets of the cache. However, a problem with this approach is that, regardless of which the first and second replacement policies is preferred, some sets of the cache will use the less preferred replacement policy. Also, the hardware for comparing the performance indicators for the first and second groups of sets and adjusting which policy is applied to the remaining group of sets can add extra circuit complexity.

In the examples discussed below, a cache request issued to the cache specifies, in addition to a target address identifying information to be accessed, a partition identifier indicative of an execution environment associated with the cache request. The execution environment could be a hardware execution environment or a software execution environment. In response to the cache request, the cache replacement control circuitry: selects the victim cache entry based on re-reference interval prediction (RRIP) values for a candidate set of cache entries, the RRIP value for a given cache entry being indicative of a relative priority with which the given cache entry is to be selected as the victim cache entry; selects, based on the partition identifier specified by the cache request, configurable replacement policy configuration data associated with the partition identifier; and sets the RRIP value of the new cache entry to an initial value selected based on the selected configurable replacement policy configuration data associated with the partition identifier.

RRIP-based replacement policies are a class of replacement policies which use an RRIP value to express the relative priority with which a given cache entry is to be selected as the victim cache entry. Various implementations of RRIP-based policies are possible, which differ in how the initial value for the RRIP value is set when allocating a new entry into the cache. In the examples discussed below, the cache replacement control circuitry uses configurable replacement policy configuration data to influence the way in which the RRIP value is initialised for a newly allocated entry. A number of sets of replacement policy configuration data can be configured for different partition identifiers, and the partition identifier specified by a particular cache request is used to select which set of configurable replacement policy configuration data to use to determine how to set the RRIP value for the newly allocated cache entry.

This enables software developers or hardware system designers to influence which replacement policy is used for handling cache allocation for requests associated with a particular execution environment. For example, a software developer may be able to predict in advance the memory access usage patterns expected for a given piece of software and decide which replacement policy may be best and so can set the replacement policy configuration data accordingly. A hardware system designer may be able to predict that cache accesses initiated by one hardware unit (e.g. a direct memory access controller or a graphics processing unit) can benefit from a different replacement policy compared to cache accesses initiated by another hardware unit (e.g. a central processing unit). Alternatively, even if it is not anticipated in advance which replacement policy is best, benchmarking of workloads can be performed in advance, with performance monitors used to track address access patterns or to analyse cache hit/miss rates when different replacement policies are used for accesses from different execution environments, with the results of the benchmarking used to set the replacement policy configuration data. Alternatively, at runtime, an initial portion of a workload may be run while performing performance monitoring to analyse cache performance for different settings for the replacement policy configuration data, and then a remaining portion of the workload can be processed based on the settings determined to give the best performance.

By supporting the ability to configure information used to influence the setting of the RRIP value, the hardware can be much less complex than the set-duelling hardware discussed above and avoids needing to use a less preferred replacement policy for a subset of sets of entries in the cache as in the set-duelling approach discussed above. RRIP-based replacement policies can be particularly useful for offering configurability without complex hardware being required, because there can be a wide variety of alternative RRIP-based policies which differ primarily in the way in which the RRIP value is initialised when the entry is newly allocated, but the way in which the RRIP value is then subsequently used to select victim entries can be similar for the different policies, so access to RRIP values after the initial allocation can be common for the different policies, requiring less variability in the hardware needed to manage the cache placement decisions when different settings are specified for the replacement policy configuration data. By setting RRIP values to different initial values for different settings of the replacement policy configuration data selected based on the partition identifier, this can be enough to provide the flexibility to adapt the replacement policy to handle different patterns of memory accesses arising for different execution environments. Hence, it can be particularly useful to provide configurability of the replacement policy control information when specifying how to set the initial RRIP value for a new cache entry.

The execution environment associated with a given partition identifier could be a hardware execution environment or a software execution environment.

For example, memory accesses initiated from different hardware units of a processing system (e.g. respective processors, or a processor and a non-processor hardware unit such as a hardware accelerator) may have the corresponding cache requests associated with different partition identifiers to distinguish the hardware unit from which the request originated. The allocation of partition identifiers to each hardware execution environment could be fixed, or configurable.

Also, different software execution environments executing on a processor could be assigned different partition identifier to distinguish the cache accesses related to particular software workloads processed by the processor.

In some examples, partition identifier selection circuitry may select the partition identifier associated with the cache request based on information specified in at least one register. The register can be a configurable register which is configurable in response to instructions processed by processing circuitry. Hence, software can specify instructions which program the register, to influence the way in which replacement policy is controlled by controlling the information used to select which partition identifier is specified for a particular cache request. For example, partition identifier defining data stored in the register may be updated on a context switch when switching between one software process and another, so that different software processes can have their cache access requests distinguished from each other and so can use different replacement policies for setting the RRIP values for new cache entries allocated for that software process.

The partition identifier selection circuitry could be part of the processing circuitry itself. For example, the at least one register specifying the information used to select the partition identifier could be at least one software-writable architectural register of the processing circuitry.

The partition identifier selection circuitry could also be part of a hardware unit which has access to memory but does not itself execute instructions. In that case, the register used to define the information that controls selection of the partition identifier may be configurable based on instructions executed at processing circuitry other than the hardware unit comprising the register. For example, the hardware unit could be a DMA (direct memory access) controller or neural processing unit (NPU—a hardware accelerator targeting acceleration of neural network processing), and the register of that hardware unit can be configured based on instructions executed at a CPU (central processing unit).

In other examples, a hardware unit may have a fixed partition identifier assigned for requests originating from that hardware unit, which is not configurable by software, but nevertheless allows requests from that hardware unit to be distinguished from requests from another hardware unit.

In some examples, a replacement policy configuration data programming interface may be provided to program the configurable replacement policy configuration data associated with a given partition identifier in response to instructions processed by processing circuitry. For example, the replacement policy configuration data programming interface could be provided using an existing memory access interface used to access memory. The programming of the configurable replacement policy configuration data could be initial programming to set the configurable replacement policy configuration data for a given partition identifier for the first time, or re-programming to update previously set configurable replacement policy configuration data to a different setting from its previous value.

The configurable replacement policy configuration data could be stored in (or accessed via) memory-mapped registers associated with the cache, which are accessible by memory access specifying the memory addresses mapped to those registers. In some cases, to reduce the number of registers exposed to the processing circuitry, one or more selection interface registers could be memory-mapped and writes to those selection interface registers (e.g. specifying updated configuration data and an indication of the partition identifier to which that updated configuration data should apply) may control the programming interface to update other registers which actually store the replacement policy configuration data. Alternatively, the configurable replacement policy configuration data could be stored in memory itself (in locations which could otherwise also be used for regular memory data, rather than being dedicated registers reserved for replacement policy configuration data). The configurable replacement policy configuration data can therefore be updated by issuing memory write requests which specify as a target address an address allocated for part of the configurable replacement policy configuration data. For example, software may specify, in a register, a base address of a data structure in memory providing the configurable replacement policy configuration data, and the cache replacement control circuitry may use that base address to determine addresses of locations in memory storing the replacement policy configuration data for a particular partition identifier.

Different types of instructions could be used by the processing circuitry to trigger the replacement policy configuration data programming interface to update of the replacement policy configuration data for a particular partition identifier. Some implementations may define a specific type of instruction for controlling programming the replacement policy configuration data for a particular partition identifier. Other examples may simply use standard memory access instructions (e.g. a store instruction) to set the replacement policy configuration data for a particular partition identifier.

Other examples may not have the replacement policy configuration data programming interface allowing software executing on the apparatus to program the replacement policy configuration data. Instead, the configurability of the replacement policy configuration data could be implemented by receiving the replacement policy configuration data from an external device (e.g. receiving the replacement policy configuration data over a network or reading the replacement policy configuration data from external data storage).

Other examples may offer both programmability of the replacement policy configuration data in software, and the option of reading in replacement policy configuration data from an external source.

The configurable replacement policy configuration data could define how to set the RRIP value for the new cache entry in a variety of ways.

In some examples, the selected configurable replacement policy configuration data specifies the initial value for the RRIP value of the new cache entry. Hence, the RRIP value to be used may be specified directly or explicitly in the replacement policy configuration data (at least for some RRIP modes supported).

In some examples, the selected configurable replacement policy configuration data specifies which of two or more RRIP modes to use for selecting the initial value for the RRIP value of the new cache entry. In this case, it is not essential for the initial RRIP value itself to be specified in the configurable replacement policy configuration data, as it could be implicit from the mode selected by the configurable replacement policy configuration data. However, at least one of the RRIP modes supported could further allow the initial RRIP value to be used in that mode to be configurable using the replacement policy configuration data.

In one example, the RRIP modes may include:
a static RRIP (SRRIP) mode which uses a static initial value for the RRIP value of the new cache entry; and
a bimodal RRIP (BRRIP) mode which selects, based on an outcome of a chance-dependent test having a given probability of resulting in a first outcome, a first initial value for the RRIP value of the new cache entry when the chance-dependent test provides the first outcome and a second initial value for the RRIP value of the new cache entry when the chance-dependent test provides the second outcome.

For example, the chance-dependent test can be any operation which can simulate a "dice roll" or other random/pseudorandom event which provides a given probability of providing the first outcome. It can be useful for the chance-dependent test to be a test which is substantially independent of the properties of an individual cache request, so that even among cache requests having exactly the same properties (e.g. target address, partition identifier) and processed when the cache is in the same state (current addresses allocated, current RRIP values) and with the same settings for the configurable replacement policy configuration data, there can be variation in whether those cache requests use the first initial value or the second initial value for the initial RRIP value selected when a new cache entry is allocated.

For some execution environments, selecting the second initial value on most occasions, but occasionally selecting the first initial value, can provide better performance than always selecting the same initial value, particularly if the first initial value indicates a lower priority for eviction than the second initial value (although it is also possible for the first initial value to indicate a higher priority for eviction than the second initial value). Therefore, supporting the bimodal RRIP mode can be beneficial. However, other execution environments do not benefit from this variation in initial value and can experience better performance with the static RRIP mode. For example, the SRRIP mode can provide better performance for scan patterns of accesses where there is a long sequence of access to different addresses with almost no reuse of previously accessed addresses in later parts of the sequence, while the BRRIP mode can better handle thrashing patterns of accesses where there is some reuse of earlier addresses in later addresses of the sequence but the working set of addresses accessed with some instances of reuse is larger than can be cached simultaneously given the limited capacity of the cache. By allowing configuration of which of these modes is used (e.g. based on previous performance analysis carried out in advance or dynamically at run-time), this can improve the average performance seen across as at the workloads.

For examples which support the SRRIP and BRRIP modes, some examples may use fixed values for the static initial value, the first initial value and the second initial value, which are implicit when one of these modes is selected. Hence, it is not essential for any further configurable control to be defined allowing the static initial value, first initial value or second initial value to be adjusted.

However, other examples may support at least one of the static initial value for the SRRIP mode, the first initial value for the BRRIP mode and the second initial value for the BRRIP mode being configurable based on the selected configurable replacement policy configuration data. This can offer further flexibility in the ability to influence the replacement policy used.

In some examples, the selected configurable replacement policy configuration data may also specify the probability with which the chance-dependent test should provide the first outcome.

In some examples, the selected configurable replacement policy configuration data specifies whether the cache replacement control circuitry is to select the initial value for the new cache entry based on RRIP information provided by a higher-level cache from which information is capable of being evicted to the cache. For example, on eviction of data from a higher-level cache, the RRIP value associated with that higher-level cache entry could be used to influence the initial RRIP value allocated in the lower-level cache. Alternatively, performance monitoring information gathered by the higher-level cache, which is indicative of cache hit/miss rates in the higher-level cache for a given partition identifier, could be used to provide an indication to the lower-level cache as to which initial RRIP value to use for new allocations made for that given partition identifier. Hence, software or an external agent (e.g. a developer controlling a device from which the configuration data is transmitted to the apparatus having the cache) may set the configurable replacement policy configuration data to control whether the information from the higher-level cache should be used by the lower level cache when selecting the initial RRIP value for a newly allocated entry.

In some examples, the only aspect of RRIP replacement policy affected by the configurable replacement policy configuration data may be the selection of the initial value to be set for an RRIP value of a newly allocated cache entry which is allocated following a cache miss for a request specifying a given partition identifier.

However, other examples can also adjust other properties of the RRIP replacement policy used when processing cache requests associated with a given partition identifier, based on the configurable replacement policy configuration data associated with the given partition identifier.

For example, in response to the cache request hitting in a matching cache entry of the cache, the cache replacement control circuitry may determine how to adjust the RRIP value of the matching cache entry based on the selected configurable replacement policy configuration data associated with the partition identifier specified by the cache request.

For example, based on the selected configurable replacement policy configuration data associated with the partition identifier specified by the cache request, the cache replacement control circuitry may determine whether to set the RRIP value of the matching cache entry to a predetermined value (e.g. the value indicating the lowest priority for eviction), or adjust the RRIP value of the matching cache entry from the current value of the RRIP value indicating a given priority for selection as the victim cache entry to a next value indicating a next lowest priority for selection as the victim cache entry. The first approach (prioritising retaining entries for which the most recent hit is detected) can benefit some execution environments. Other execution environments may benefit from the second approach (prioritising retaining entries which are accessed more frequently even if not accessed recently). Hence, providing the ability to configure which approach is used to adjust the RRIP value on a cache hit can be useful to allow the cache replacement policy to be tailored to the needs of the particular execution environment which caused the cache request to be issued.

In some examples, the predetermined value (to which the RRIP value of the hit cache entry is updated if the first approach described above is used) can itself be configurable using the configurable replacement policy configuration data. Other approaches may use a fixed value for the predetermined value.

In some examples, performance monitoring circuitry may be provided to maintain a number of instances of performance monitoring information associated with respective partition identifiers, a given instance of performance monitoring information for a given partition identifier specifying information indicative of performance detected for the execution environment associated with the given partition identifier. The performance monitoring information could be any information which can be used to distinguish whether performance is good or bad for an execution environment. In some examples, the performance monitoring information could be a cache metric tracked based on cache accesses made in response to cache requests specifying the given partition identifier. For example, the cache metric could be a parameter indicative of cache hit rate or cache miss rate, or a cache access latency parameter indicative of latency associated with obtaining the information requested from the cache (which may be shorter if there is a hit in the cache compared to a miss requiring a linefill from a further cache or memory). In other examples, the performance monitoring information may not be directly based on monitoring of the behaviour of cache requests made for an execution environment, but may track performance for the execution environment more generally. For example, the performance monitoring information could specify a length of time or number of processing cycles taken to perform a given software workload, or a measure of the rate at which instructions are executed for the workload (e.g. instructions processed per cycle). These more generic performance monitoring metrics may not directly attribute the observed performance to any particular cache behaviour (and could also be influenced by other mechanisms not related to cache access), but may nevertheless depend on the performance achieved in accessing the cache, and so may be useful metrics for analyzing how varying the cache replacement policy settings used affects performance for an execution environment. The performance monitoring information can be exposed to software, so that software can read the information and use it to decide how to set the configurable replacement policy configuration data. This can help software determine the preferred settings of the configurable replacement policy configuration data for a given software workload. Alternatively, the performance monitoring information can be exported to an external device for analysis on the external device.

In some examples, the processing circuitry may support operating in a number of different security states, which may be associated with different rights to access information stored in registers or memory, for example. The cache request may specify a security state identifier indicative of a security state associated with the cache request. The cache replacement control circuitry may select the configurable replacement policy configuration data based on the partition identifier and the security state identifier. Hence, different sets of configurable replacement policy configuration data may be provided for different combinations of partition identifier and security state identifier. By using separate sets of replacement policy configuration data for the same partition identifier specified in different security states, this can avoid less secure software associated with one security state being able to influence the cache replacement policy associated with more secure software executing in a different security state, helping to preserve the performance for the more secure software.

The partition identifier is used as a label to distinguish one set of cache requests from another, depending on the execution environment that caused the requests to be issued. The partition identifier is used to select the set of configurable replacement policy configuration data used to control cache replacement policy. In some examples the partition identifier could also be used to select other configuration information which may influence the allocation of performance resources as a memory system component. For example, the configuration information selected based on the partition identifier may also influence how much of the cache capacity can be allocated for information associated with that partition identifier, and/or influence allocation of memory system bandwidth on a bus or interconnect network.

However, when looking up the cache based on the target address of the cache request, whether the lookup detects a hit or miss in the cache may be independent of the partition identifier specified by the cache request. Hence, information allocated the cache in response to a cache request specifying one partition identifier may be accessible in response to a cache request specifying a different partition identifier. The partition identifier may merely be a label to distinguish different classes of requests for the purpose of control of performance-influencing resources such as the cache or memory system bandwidth, rather than being used for determining whether a given address of information is accessible at all for a particular execution environment. Whether a given address of information is accessible may depend on other information such as page table access permissions and/or an operating state in which the memory access request is issued (e.g. based on privilege level, exception level and/or security state).

In one example, the apparatus comprises at least one central processing unit and at least one graphics processing unit, where the cache is a shared cache accessible to the at least one central processing unit and also accessible to the at least one graphics processing unit. The at least one CPU and the at least one GPU may each have processing circuitry as discussed above for selecting the partition identifier based on information specified in at least one software-writable architectural register. In a system where a cache is shared between at least one CPU and at least one GPU, different cache replacement policies may be preferred for the CPU-originating accesses and the GPU-originating accesses respectively. The GPU cache accesses in particular may suffer from typical set-duelling approaches to adapting the cache replacement policy. For example, if a set-duelling approach as mentioned above is used to select between SRRIP and BRRIP, this does not work well for many GPU benchmarks because the working set of addresses accessed by the GPU can be larger than the cache capacity can accommodate, and so the set-duelling approach (which limits analysis of the performance achieved for a given policy to a small subset of the sets of the cache) may make the wrong choice between SRRIP and BRRIP. By allowing configuration data to be defined which specifies cache replacement policy control settings (e.g. which of SRRIP and BRRIP to use) for different execution environments (e.g. the CPU and the GPU, or different software workloads associated with the CPU and GPU), this can improve performance by allowing a choice of replacement policy more suited to that particular software workload. CPU originating cache access traffic can be allocated a different partition identifier to the partition identifier used by GPU traffic and so can use a different replacement policy to the one used by the GPU. Hence, the technique above is particularly useful in a system having at least one CPU and at least one GPU sharing access to a shared cache.

FIG. 1 schematically illustrates an example of a data processing apparatus 2 having processing circuitry 4 and a cache 6. For example, the cache 6 could be an instruction cache for caching instructions, a data cache for caching data, or a shared cache which can cache both instructions to be fetched for processing and data accessed from memory in response to load/store instructions processed by the processing circuitry 4. The cache 6 can be at any level of a cache hierarchy. For example, the cache 6 could be a level 1, level 2, level 3, or system cache. Although the cache 6 is shown separate from the processing circuitry 4, in some implementations (especially if the cache is a level 1 or level 2 cache) the cache 6 can be regarded as part of the processing circuitry. If the cache 6 is at a level of the cache hierarchy other than level 1, then there may also be a higher-level cache 8 accessible to the processing circuitry 4, where information can be evicted from the higher-level cache 8 to the cache 6 at a lower level of the cache hierarchy. Although not illustrated in FIG. 1 conciseness, the system also includes one or more memory devices which provide a backing store of information from which a subset of information is cached in the caches 6, 8.

The processing circuitry 4 includes fetch circuitry 10 to fetch instructions from the cache 6, 8 or memory, decode circuitry 12 to decode the fetched instructions, and execute circuitry 14 to execute the instructions to perform data processing operations. Operands for the instructions may be read by the execute circuitry 14 from registers 16, and results of executed instructions may be written to the registers 16. Hence, the software executed by the processing circuitry 4 has the ability to influence which architectural data are stored in the registers 16.

The registers 16 include one or more partition identifier control registers 18 used to set a partition identifier which is specified by a cache request 19 sent to the cache 6 by the processing circuitry 4 to request access to information that may be stored in the cache 6. The processing circuitry 4 has partition identifier selection circuitry 17 which selects which partition identifier is specified by the cache request 19, based on the information stored in the one or more partition identifier control registers 18. The partition identifier (PARTID) acts as a label to distinguish cache requests issued on behalf of different execution environments (e.g. software execution environments executed by the processing circuitry 4). The partition identifier does not influence which addresses in memory are allowed to be accessed by a particular execution environment, but is used for resource allocation control for regulating the level of performance seen for memory access is issued by a particular execution environment. In the examples discussed below, the cache 6 uses the partition identifier to influence the cache replacement policy used to select victim cache entries to be reallocated for a new address to be allocated in the cache, but the partition identifier can also be used for other aspects of resource allocation such as controlling the amount of memory system bandwidth which a particular execution environment is allowed to use, or setting a maximum fraction of cache capacity that a given execution environment is allowed to allocate for its own information. Such resource allocation controls can be useful to prevent a "noisy" execution environment (which generates frequent cache requests) monopolizing a significant fraction of the available memory system resource (which may otherwise harm performance for other execution environments with less frequent requests which might not be able to gain sufficient usage of memory system resource if the amount of resource used by the "noisy" execution environment was not limited). Hence, it will be appreciated that the partition identifier could optionally be used for additional purposes, but the examples below focus on the use of the partition identifier for controlling cache replacement control.

In the specific case of software execution environments executed by processing circuitry 4, each software execution environment could be a different process or thread executed by the processing circuitry 4 or a sub-portion of instructions executed within such a process or thread (hence in some examples different parts of the same process or thread could be allocated different partition identifiers). The way in which the set of software to be executed by the processing circuitry 4 is partitioned into different software execution environments allocated different partition identifier is controlled by the software itself, by setting the partition identifier control information in one or more partition identifier control registers 18.

As mentioned further below with respect to FIG. 8, partition identifiers could also be assigned to particular hardware execution environments in the system. For example, cache requests initiated from different hardware units can be assigned different partition identifiers. Hence, it is not essential that a partition identifier is associated with a particular software execution environment.

In some examples, the allocation of partition identifiers can be fixed, selected by hardware. For example, the partition identifiers used for requests initiated from different hardware execution environments can be hardwired in the circuit design, or the partition identifiers used for particular software execution environments could be derived from software execution environment identifiers such as thread identifiers or process identifiers in a manner which does not allow the software itself to vary the partition identifier used. Such an example may still offer the ability to influence cache replacement policy by configuring the replacement policy configuration data 24 which is associated with a particular partition identifier.

However, it can be useful to offer the ability for software to program which partition identifiers are used for particular execution environments. Hence, the partition identifier control registers 18 can be provided to allow software to configure information used to control the selection of the partition identifier used for a particular cache request 19.

In a relatively simple implementation, the partition identifier control registers 18 may include a single register to which a partition identifier can be written by software. In such implementations, cache requests 19 issued by the processing circuitry 4 specify the partition identifier currently specified in the register 18. When switching between different portions of software requiring their cache requests to be distinguished from each other for performance resource control purposes (e.g. on a context switch), software updates the partition identifier control register 18 to specify the partition identifier for the new software to be executed after the switch, and then subsequent cache requests will specify the new partition identifier.

Other examples could implement multiple partition identifier control registers 18 specifying partition identifiers associated with different operating states (e.g. privilege levels or exception levels associated with the processing circuitry 4), and the current operating state of the processing circuitry 4 at the time a cache request 19 is issued may be used to select which partition identifier control register 18 is selected by the partition identifier selection circuitry 17, and hence which partition identifier is specified in the cache request 19. For example, this can be useful to avoid software needing to rewrite partition identifier control registers 18 each time there is a supervisor call or exception taken to a more privileged operating states or an exception return back to a less privileged operating state, which may be relatively frequent events.

Some implementations may provide an architectural mechanism for enabling different partition identifiers for to be specified for different classes of cache request 19 issued in the same software execution environment. For example, there may be fields within the partition identifier control registers 18 for specifying different partition identifiers for data cache requests issued in response to load/store instructions executed by the execute circuitry 14, instruction fetch cache requests issued in response to instruction fetch requests made by the fetch circuitry and/or page table walk cache requests issued by the processing circuitry 4 to request access to page table information used to translate addresses of cache/memory access requests.

Also, in some cases the partition identifier specified in the cache request 19 may not be exactly the same as the partition identifier value stored in the partition identifier control register 18. Some implementations of the partition identifier selection circuitry 17 may support a partition identifier virtualisation scheme where a virtual partition identifier written by software to the partition identifier control registers 18 is remapped to a physical partition identifier appended to the cache request 19, based on partition identifier remapping information which can be defined by software. This can allow a number of different pieces of less privileged software (e.g. operating systems) to coexist on the system while independently setting the partition identifiers to be used for different software execution environments managed by the less privileged software, with more privileged software (e.g. a hypervisor) defining the partition identifier remapping information so that conflicting partition identifiers set by different operating systems can be mapped to different partition identifiers as seen by the cache 6.

Hence, it will be appreciated that there are a wide variety of ways in which the partition identifier of the cache request 19 could be determined by the partition identifier selection circuitry 17, but in some examples the processing circuitry 4 has circuitry to select the partition identifier to be associated with the cache request, based on information specified by software in at least one software-writable architectural register 18.

In some implementations, the processing circuitry 4 also supports operating in different security states, which may be associated with different access rights to execute instructions and/or access information in memory, the cache 6, 8 or registers 16. A security state identifier associated with a current security state may also be specified by the cache request 19. The cache request 19 also specifies the target address of the information to be accessed in the cache.

The cache 6 has storage circuitry 20 for storing cached information and related tags (used for determining on a cache lookup whether a cache entry relates to the target address of the cache request). The cache 6 also has cache replacement control circuitry 22 for controlling replacement of cache entries in the storage circuitry 20. The cache 6 is a set-associative or fully-associative cache, and so when a new entry is to be allocated to the cache, there is more than one entry available that could be selected (selected from a set of entries selected based on the target address if the cache is set-associative, or selected from among all cache entries if the cache is fully-associative). The cache replacement control circuitry 22 is responsible for selecting which entry is the victim entry to be replaced with the new entry.

The cache replacement control circuitry 22 has access to a number of sets of replacement policy configuration data 24 associated with different partition identifiers. Although not illustrated in FIG. 1, if the processing circuitry 4 supports operating with different security states and the cache request 19 specifies the security state identifier, then sets of replacement policy configuration data 24 can be defined for different combinations of values of the partition identifier and security state identifier, so that different replacement policy configuration data can be used for requests specifying the same partition identifier but issued in different security states of the processing circuitry.

Each set of replacement policy configuration data is configurable. In some examples, the configuration interface used to configure the replacement policy configuration data is an interface to an external device, e.g. an I/O interface such as a network interface over which replacement policy configuration data can be received from an external device or an I/O port from which data can be read in from external data storage.

However, in the example of FIG. 1, the replacement policy configuration data 24 is programmable by software executing on the processing circuitry 4, by using a programming interface 26. A wide variety of mechanisms can be used to implement the programming interface 26 and the replacement policy configuration data 24. In one example, the replacement policy configuration data 24 is a data structure stored in locations of the memory system that could also be used to store the backing store of information, from which a subset of information is cached in the cache 6. Hence, the programming interface 26 could simply be the regular load/store interface used by the processing circuitry 4 to read or write data in memory. The cache replacement control circuitry 22 may have access to a replacement policy configuration data structure address which is configurable by software, and specifies a base address of the data structure providing the replacement policy configuration data 24, which the cache replacement control circuitry 22 can then use in combination with the partition identifier (and security state identifier, if supported), to index into the relevant set of replacement policy configuration data for the partition identifier and security state specified by the cache request 19. The cache 6 may be able to cache some portions of replacement policy configuration data 24 in local storage closer to the cache 6, to avoid needing to access memory every time the replacement policy configuration data 24 for a given partition identifier (and security state identifier) is needed.

In other examples, the cache 6 (or the programming interface 26) may have a set of registers for storing the replacement policy configuration data 24 (which are not available for storing standard memory-based information), rather than using main memory to store the replacement policy configuration data 24. The programming interface 26 could expose the replacement policy configuration data registers (which actually store the replacement policy configuration data 24) to software as memory mapped registers accessible by load/store instructions specifying memory addresses mapped to those registers. Alternatively, to reduce the number of addresses which need to be mapped and exposed the software, the memory-mapped registers which software can see may be a set of selection interface registers to which software can write updated replacement policy configuration data to be written to the set of replacement policy configuration data for a given partition identifier (and given security state identifier if implemented), and selection information identifying the given partition identifier (and given security state identifier if implemented). In that case, the registers storing the replacement policy configuration data 24 itself would not need to be memory-mapped, but can be accessed by the internal hardware of the programming interface 26 based on the software-programmed information in the memory-mapped selection registers.

Regardless of the exact mechanism by which the software is able to program the replacement policy configuration data 24, providing a programming interface 26 enables software to set information which is used by the cache replacement control circuitry 22 in determining how to implement its cache replacement policy. This can be useful because different software or hardware execution environments may experience different levels of performance for different cache replacement policies, so the preferred cache replacement policy may vary from one software workload to another.

In some examples, performance monitoring circuitry 28 may be provided to monitor one or more performance metrics, separately for cache requests 19 associated with different partition identifiers, indicating information relevant to the level of performance seen by cache requests 19 specifying the corresponding partition identifier. For example the performance monitoring circuitry 28 may track cache hit or miss rates for the different partition identifiers, or monitor latency associated with obtaining information required by a cache request (which may be slower for a cache miss than for a cache hit), to obtain a metric such as average latency or fraction of cache accesses with latency greater than a threshold. The performance monitoring data could also track other performance-indicating information which is not directly related to cache accesses, e.g. number of instructions executed per cycle for a workload associated with the corresponding partition identifier, or a length of time or number of cycles taken to process the workload. The performance monitoring data gathered by the performance monitoring circuitry 28 can also be made accessible to an external device and/or exposed to software executing on the processing circuitry 4 (for example through access to memory-mapped registers or a memory-based data structure maintained by the performance monitoring circuitry 28 at a given address region allocated for the performance monitoring data). This performance monitoring data can be used by software to evaluate whether a particular cache replacement policy is working well for a given execution environment or not, and hence decide whether to change the information specified by the corresponding set of replacement policy configuration data 24. For example, software can benchmark applications with different settings of the replacement policy configuration data and use the performance monitoring information to decide which settings for the replacement policy configuration data give the highest performance.

Figure 2:
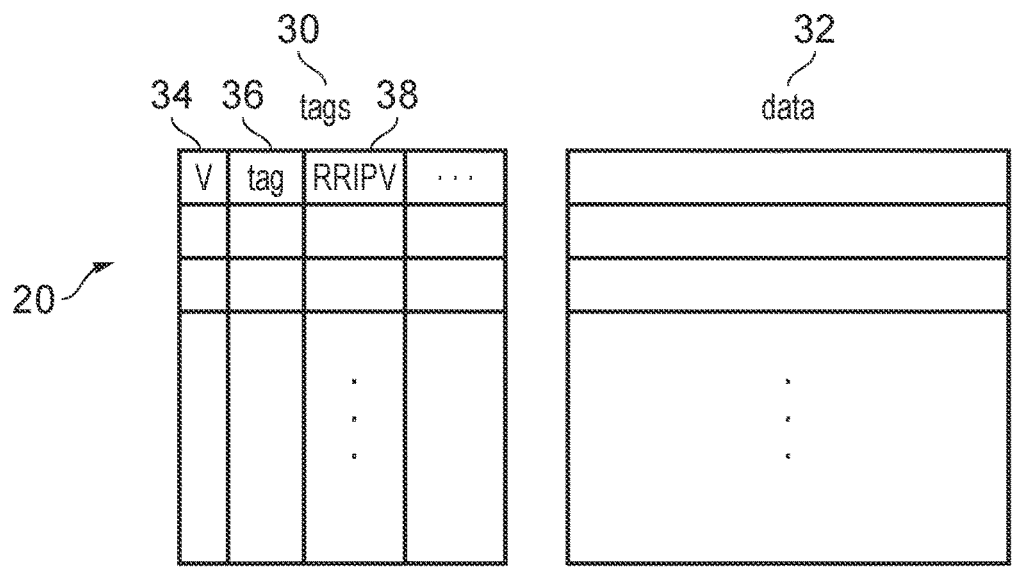
FIG. 2 illustrates an example of maintaining re-reference interval prediction (RRIP) values to indicate a relative priority with which cache entries are to be selected as a victim cache entry to be replaced in the cache.

FIG. 2 illustrates an example of the cache storage 20, with support for an RRIP replacement policy. In this example, the cache tag storage 30 and data storage 32 are implemented as separate arrays of cache entries, but other examples could store the tags in the same storage array as the data. In FIG. 2, the term data is used in the generic sense including instructions, so the cache 6 could be an instruction cache or a data cache or a shared cache used for both data and instructions. For each cache entry, the tag information includes at least a valid indicator 34 indicating whether the entry is valid, a cache tag 36 indicating information used to distinguish which address corresponds to the data in the corresponding cache entry, and an RRIP value (RRIPV) 38 which indicates a relative priority with which the corresponding entry is to be selected as a victim entry when a cache replacement needs to be made. When a cache replacement is made, the victim entry is selected from among a set of candidate cache entries based on the RRIP values 38 of the candidate cache entries. In general, the cache replacement policy may choose the victim so that it is more likely that a candidate cache entry with a RRIP value indicating a higher priority for eviction is selected as the victim cache entry than a candidate cache entry with a RRIP value indicating a lower priority for eviction. While not shown in FIG. 2, the tag information may also specify other information, such as a coherency state used for controlling cache coherency, for example.

The RRIP value 38 is set based on a prediction of the re-reference interval (distance to the next access to the cached information). Different variants of RRIP replacement policies may have different rules for setting the RRIP value 38 on a new allocation of a new entry and when a hit to an existing entry is detected. The set of replacement policy configuration data 24 selected for the partition identifier specified by the cache request 19 can be used by the cache replacement control circuitry 22 to determine how to set the RRIP value 38 for cache entries.

Figure 3:
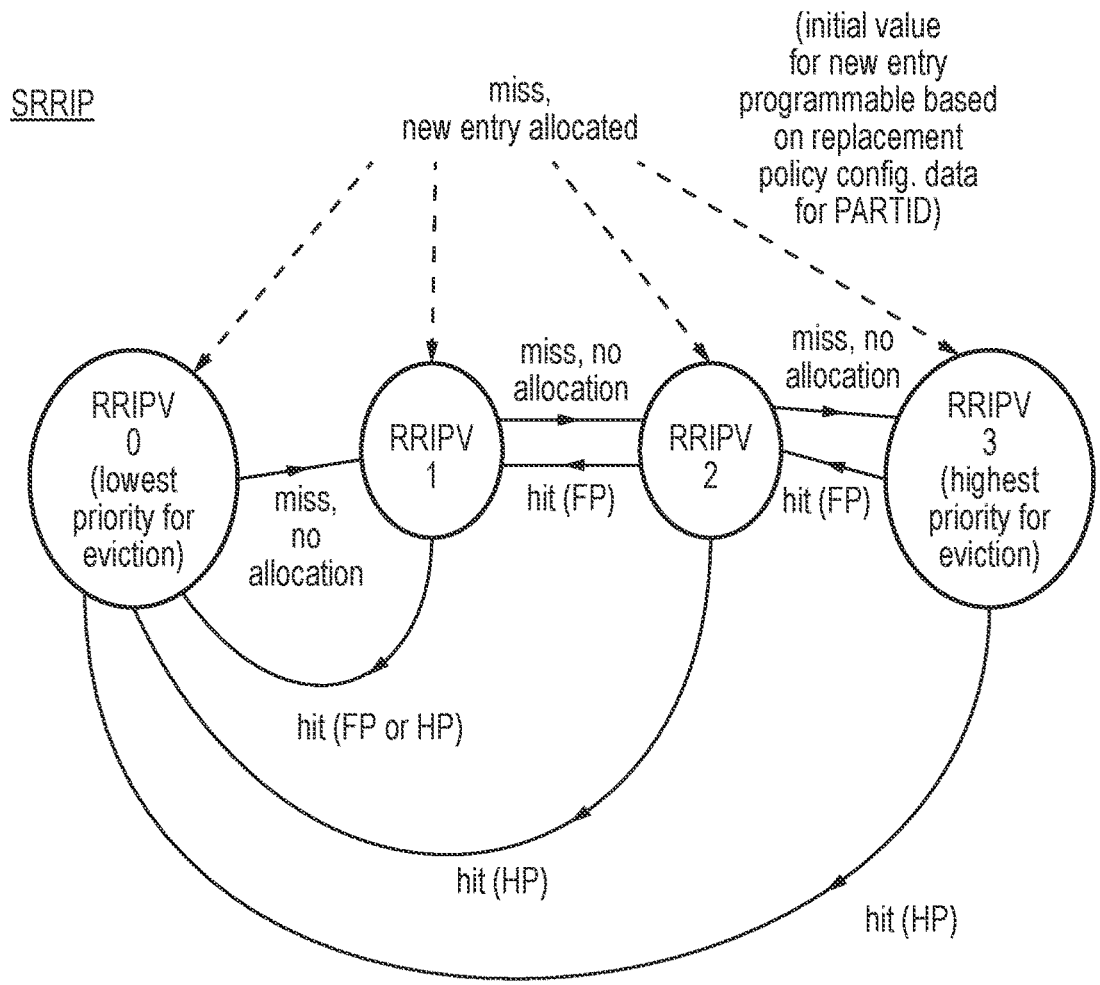
FIG. 3 illustrates an example of a static RRIP (SRRIP) cache replacement policy.

FIG. 3 shows an example of a static RRIP (SRRIP) replacement policy. This example assumes that each RRIP value 38 has two bits and therefore there are four different RRIP values possible for each cache entry. FIG. 3 is a state diagram showing the transitions between RRIP values which may occur for a particular cache entry. In this example, the four states possible for the RRIP value of a particular cache entry are: RRIPV=0, RRIPV=1, RRIPV=2 and RRIPV=3 (where RRIPV=0 indicates the lowest priority for eviction and RRIPV=3 indicates the highest priority for eviction). It will be appreciated that other examples could have RRIP values with a larger number of bits so that there are more than four states. Also, other examples may represent the highest priority for eviction using the lowest numeric value of the RRIP value 38, and represent the lowest priority for eviction using the RRIP value with the highest numeric value.

Following a miss detected in the cache lookup performed for the target address of a cache request, the cache replacement control circuitry 22 may determine based on the RRIP values of candidate entries (the entries available for selection as a victim entry to be replaced with information for the target address) whether any of the candidate entries should be selected as the victim entry and replaced. The candidate entries could be a set of entries selected based on the address looked up in the cache (in a set-associative cache), or could be all the entries of the cache (in a fully-associative cache). A victim entry may be selected for eviction and re-allocation if at least one of the candidate entries has the RRIP value indicating a priority for eviction higher than a certain threshold. For example, the priority threshold could be RRIPV=2 so that a replacement is made when at least one candidate entry has RRIPV=3.

When a replacement is made, and a given cache entry is allocated as a new cache entry for storing the newly allocated information corresponding to the particular address, the RRIP value 38 for that entry is initialised to a particular value. For a static RRIP replacement policy, the initial value chosen is static, in the sense that all entries allocated under the SRRIP policy (for a given set of control parameters defined by the replacement policy configuration data 24) use the same initial value of the RRIP value 38 when first allocated, and there is no statistical variation of which initial value is used between different allocations as discussed further with respect to the bimodal RRIP (BRRIP) policy discussed with respect to FIG. 4 below. In the SRRIP policy shown in FIG. 3, the initial RRIP value for the SRRIP policy is a parameter of the replacement policy. For example, for an LRU (least recently used) implementation of the SRRIP policy, the initial value would be the value indicating the lowest priority for eviction (e.g. RRIPV=0 in the example of FIG. 3). For an implementation of SRRIP targeting scan access patterns (which, in a stream of addresses accessed in sequence, are relatively unlikely to require the same address more than once), or thrashing access patterns (which show some temporal locality, but with a working set larger than the cache capacity), it can be better to use an initial RRIP value which has a higher priority for eviction (e.g. RRIPV=2 or RRIPV=3 in the example of FIG. 3). In a typical implementation of an SRRIP policy, the initial value chosen is fixed and is always the same. However, in the approach shown in FIG. 1 using replacement policy configuration data 24 to select the replacement policy applied, as shown in the dotted lines at the top of FIG. 3, the initial RRIP value for a newly allocated entry may be configurable based on the replacement policy configuration data 24 associated with the partition identifier specified by the cache access request which causes the allocation of new entry.

If, following the miss in the cache lookup, the cache replacement control circuitry 22 determined not to replace any entry with the information for the target address which missed in the cache lookup, then the RRIP values for each candidate entry looked up in the lookup are updated to advance the RRIP values to the next highest priority for eviction. For example, in the encoding shown in FIG. 3, each RRIP value of a candidate entry is incremented (see the state transitions indicating "miss, no allocation" in FIG. 3). No transition for "miss, no allocation" is shown from the state RRIPV=3, because if there was an entry with RRIPV=3 then an allocation would be made and so "miss, no allocation" does not arise.

On a hit in the cache lookup for a given address, the RRIP value for the hit entry can be modified in different ways. In a "hit priority" (HP) scheme, regardless of the current RRIP value of the hit entry, that entry's RRIP value 38 is updated to indicate a predetermined value, e.g. the lowest priority for eviction (RRIPV=0) in the example of FIG. 3. This approach will tend to favour for retention the cache the most recently accessed addresses. In contrast, if a "frequency priority" (FP) scheme is used, then the RRIP value of the hit entry is updated to indicate the next lowest priority for eviction after the priority indicated by the current RRIP value of the hit entry. In the encoding shown in FIG. 3, for example, in the FP scheme, the RRIP value is decremented (unless the RRIP value for the hit entry was already equal to 0, indicating the lowest priority for eviction, in which case it retains its current value). The FP scheme tends to favour for retention in the cache the addresses which are accessed frequently, even if not accessed as recently as another address which was accessed less frequently. Some examples may always use a fixed one of the FP and HP schemes to update RRIP values on a hit in the cache. However, as mentioned below, other examples may select whether to use the FP or HP scheme based on the replacement policy configuration data 24 selected based on the partition identifier specified by the cache access request which accesses the hit entry.

Figure 4:
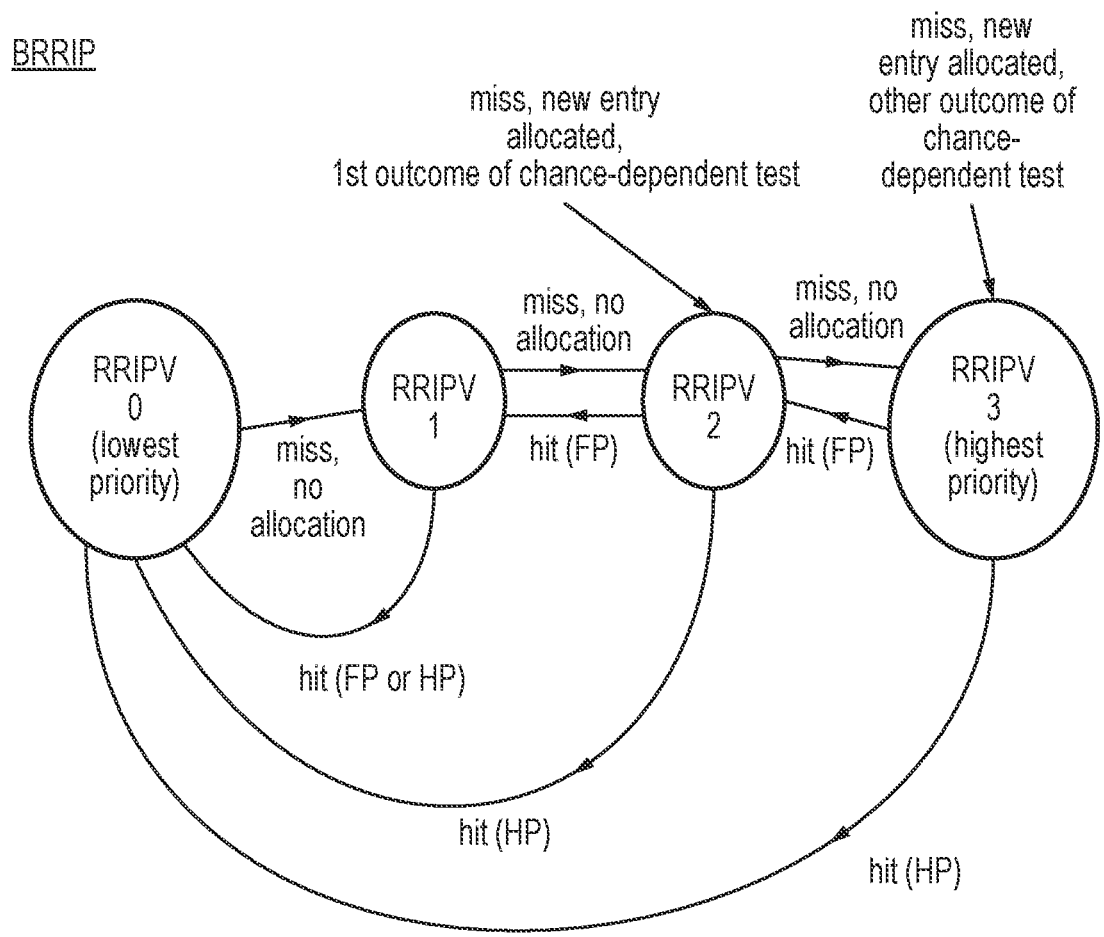
FIG. 4 illustrates an example of a bimodal RRIP (BRRIP) cache replacement policy.

FIG. 4 shows a similar state diagram illustrating a bimodal RRIP (BRRIP) replacement policy. The state diagram assumes the same number of bits and same encoding for the RRIP values as shown in FIG. 3 (again, it will be appreciated this is just one example of how to encode RRIP values). The behaviour on a miss when there is no new allocation into the cache, and the behaviour on a hit in the cache, are the same as shown in FIG. 3 for the SRRIP policy. However, for BRRIP, the initial RRIP value selected when a new allocation is made in the cache is varied statistically based on the outcome of the chance-dependent test. When the outcome of the chance-dependent test is a first outcome, the new entry is allocated with a first initial RRIP value (e.g. RRIPV=2 in the example of FIG. 4). When the outcome of the chance-dependent test is not the first outcome, the new entry is allocated with a second initial RRIP value (e.g. RRIPV=3 in the example of FIG. 4).

The chance-dependent test may be analogous to a dice roll or a lottery draw, providing a given probability of having the first outcome, where it is a matter of chance whether the first outcome will occur for any given instance of a cache allocation. Hence, even if two cache requests are controlled based on identical parameters (e.g. same target address, same partition identifier/security state, same current cache state (e.g. which addresses are cached in the cache and the current RRIP values for those entries), and same settings for the replacement policy configuration data 24 used for the partition identifier specified by the cache request), then the chance-dependent test may nevertheless provide different outcomes for those requests (e.g. the first outcome for one of those requests and another outcome for the another of those requests). Providing some statistical variation in which initial RRIP value is selected when allocating into the cache, even among requests which otherwise are subject to the same replacement policy, can be helpful to improve performance for some processing workloads such as thrashing workloads, as occasionally selecting an initial RRIP value other than the highest priority RRIP value can allow some addresses to remain in the cache for longer to improve performance if there is some temporal locality in access patterns.

The chance-dependent test could be implemented in many different ways. For example, a random number generator (or pseudorandom number generator) could be used to generate a (pseudo) random number with a certain number of bits, and if that number has a particular value then the test is considered to provide the first outcome while other values of the (pseudo) random number are considered to provide other outcomes. The probability of the first outcome occurring therefore depends on the number of bits in the (pseudo) random number.

Another approach can be that a counter is incremented or decremented each time a particular event occurs. The current value of the counter is checked when a new cache allocation is made, and if the counter (or a subset of bits of the counter) has a particular value then the test is considered to provide the first outcome while other values of the counter are considered to provide other outcomes. The event which triggers the counter to advance could be any event and does not need to be related to cache accesses. For example, there may be an existing counter in the system which counts events which are completely uncorrelated with cache allocations, such as the number of elapsed processing cycles, the number of executed instructions, etc. Alternatively, the event could be a cache-access related event, such as the occurrence of a cache request or of a new allocation into the cache. Regardless of what event is counted by the counter, by sampling a subset of bits of such a counter (e.g. the least significant N bits, which are likely to have a more even probability distribution in value than more significant bits), a value may be obtained which has a relatively even probability of having any particular numeric value, with the number of bits sampled defining the probability with which the first outcome (a particular value of the sampled bits) occurs.

Similarly, other data values present on the system (not necessarily counters) could have bits sampled from the data value for use in the chance-dependent test. Again, the number of bits sampled for the chance-dependent test affects the probability with which the sampled bits have a certain value corresponding to the first outcome.

While not shown in FIG. 4, the particular RRIP values (used as the initial RRIP values on a new allocation when the chance-dependent test provides the first outcome and the other outcome respectively) can also be configurable based on the replacement policy configuration data 24.

FIG. 5 illustrates an example of a set of replacement policy configuration data 24 defined for a particular partition identifier (or combination of partition identifier and security states, if the security state is used for selection of replacement policy configuration data 24). In this example, the set of replacement policy configuration data 24 includes various parameters 80-92. Each parameter can be included, but is optional and so could also be omitted from the set of replacement policy configuration data 24. If a particular one of the parameters is not specified in the set of replacement policy configuration data 24, then a default behaviour may be assumed by the cache replacement control circuitry 22, as explained below. In this example, the parameters 80-92 supported are:

a replacement policy mode selection control 80 indicating whether the replacement policy to use is SRRIP (e.g. as shown in FIG. 3) or BRRIP (e.g. as shown in FIG. 3). The default behaviour in the absence of this parameter being specified is to use the SRRIP mode.

an RRIPV-adjustment-on-hit mode selection control 82 indicating whether adjustments to RRIP values 38 on a hit in the cache should be controlled according to the FP or HP mode discussed above. The default behaviour in the absence of this parameter being specified is to use the FP mode.

an HP-updated-value selection control 84 specifying the updated RRIPV 38 to be set following a hit in a cache entry when the HP mode is used. Hence, while FIG. 3 shows an example where on a hit in the HP mode, the RRIP value 38 of the hit entry is set to 0 (which is the default behaviour if the control 84 is not specified), this control (if specified) allows the new RRIP value set on a hit to be programmed based on the replacement policy configuration data 24.

an SRRIP-initial-RRIPV control 86 specifying the initial RRIP value 38 to be set for a newly allocated cache entry when the SRRIP policy is being used. The default behaviour in the absence of this control being specified is to use a default of 2'b10 (i.e. RRIPV=2).

a BRRIP first-outcome-initial-RRIPV control 88 specifying the initial RRIP value 38 to be set for a newly allocated cache entry when the BRRIP policy is being used and the outcome of the chance-dependent test is the first outcome. The default behaviour in the absence of this control being specified is to use a default of 2'b10 (i.e. RRIPV=2).

a BRRIP-second-outcome-initial-RRIPV control 90 specifying the initial RRIP value 38 to be set for a newly allocated cache entry when the BRRIP policy is being used and the outcome of the chance-dependent test is an outcome other than the first outcome. The default behaviour in the absence of this control being specified is to use a default of 2'b11 (i.e. RRIPV=3).

a higher-cache-RRIP-input control 92 which indicates whether the initial RRIP value 38 to be set for a newly allocated cache entry should be set based on RRIPV information provided from a higher-level cache (e.g. cache 8 in FIG. 1). For example, this could be useful if the higher-level cache 8 has any information available which could indicate the pattern of access expected for the addresses being allocated into the lower-level cache 6 for requests made for a given partition identifier. The default behaviour in the absence of this control being specified is that the information from any higher-level cache (if any) is to be ignored, so that the initial RRIP value 38 set for the newly allocated cache entry does not depend on any information from the higher-level cache.

Although not shown in FIG. 5, it is also possible to provide a further control which specifies the probability with which the chance-dependent test is to provide the first outcome when the BRRIP mode is used. Hence, while FIG. 5 shows an example where the probability of the first outcome is 1/32 and the probability of another outcome occurring is 31/32, other examples could use a different probability and allow this probability to be varied by reprogramming or configuring the replacement policy configuration data 24. For example, this control could be used to vary the number of bits of a data value, register or counter that are sampled to implement the chance-dependent test.

It will be appreciated that the specific controls shown in FIG. 5, and the default settings specified for these controls, could vary and FIG. 5 shows just one example of how configurable replacement policy configuration information 24 can influence the setting of RRIP values in an RRIP-based cache replacement policy.

Hence, with this approach, software or an external agent can set parameters 24 which influence the way in which the cache replacement hardware implements replacement policy. This means that, rather than the cache replacement control circuitry applying a single fixed replacement policy to all requests, which may harm performance for some execution environments, the cache replacement control circuitry 22 can tailor its replacement decisions to the needs of the particular workload. The settings to be defined in the replacement policy information 24 for a particular partition identifier can be learned in advance by analysing performance of benchmark workloads, or by use of runtime tests using the performance monitoring circuitry 28 to track cache hit rates for various groups of requests assigned different partition identifiers and then using the performance detected from the performance monitoring data to decide which cache replacement control policy works best for a given execution environment.

Figure 6:
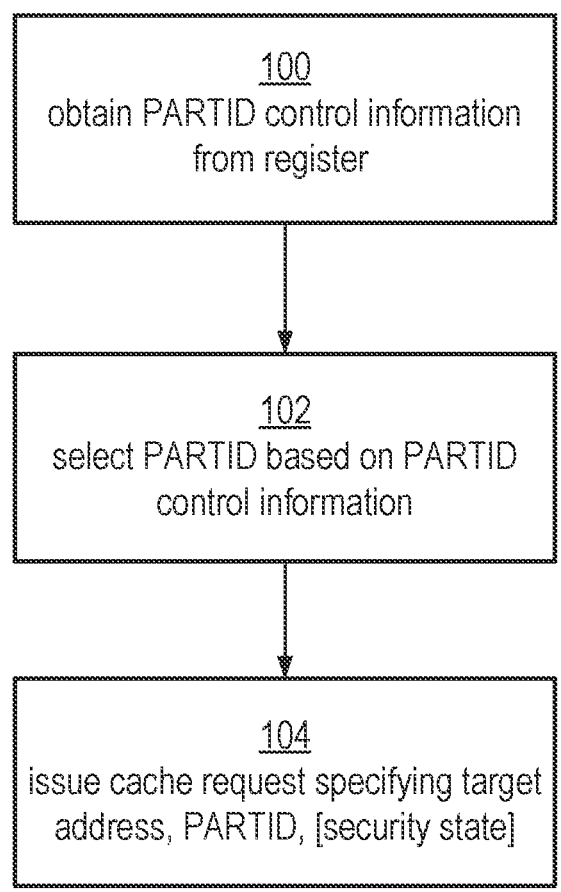
FIG. 6 illustrates an example method for a requestor to issue a cache request specifying a partition identifier.

FIG. 6 is a flow diagram illustrating a method of issuing a cache request. At step 100, a requestor of access to memory (e.g. the processing circuitry 4 mentioned earlier) obtains partition identifier control information from at least one register 18. At step 102, a partition identifier is selected by partition identifier selection circuitry 17 based on the partition identifier control information. At step 104, the requestor issues a cache request specifying a target address of information to be accessed, the partition identifier selected at step 102, and optionally a security state identifier identifying a security state in which the request was issued.

Figure 7:
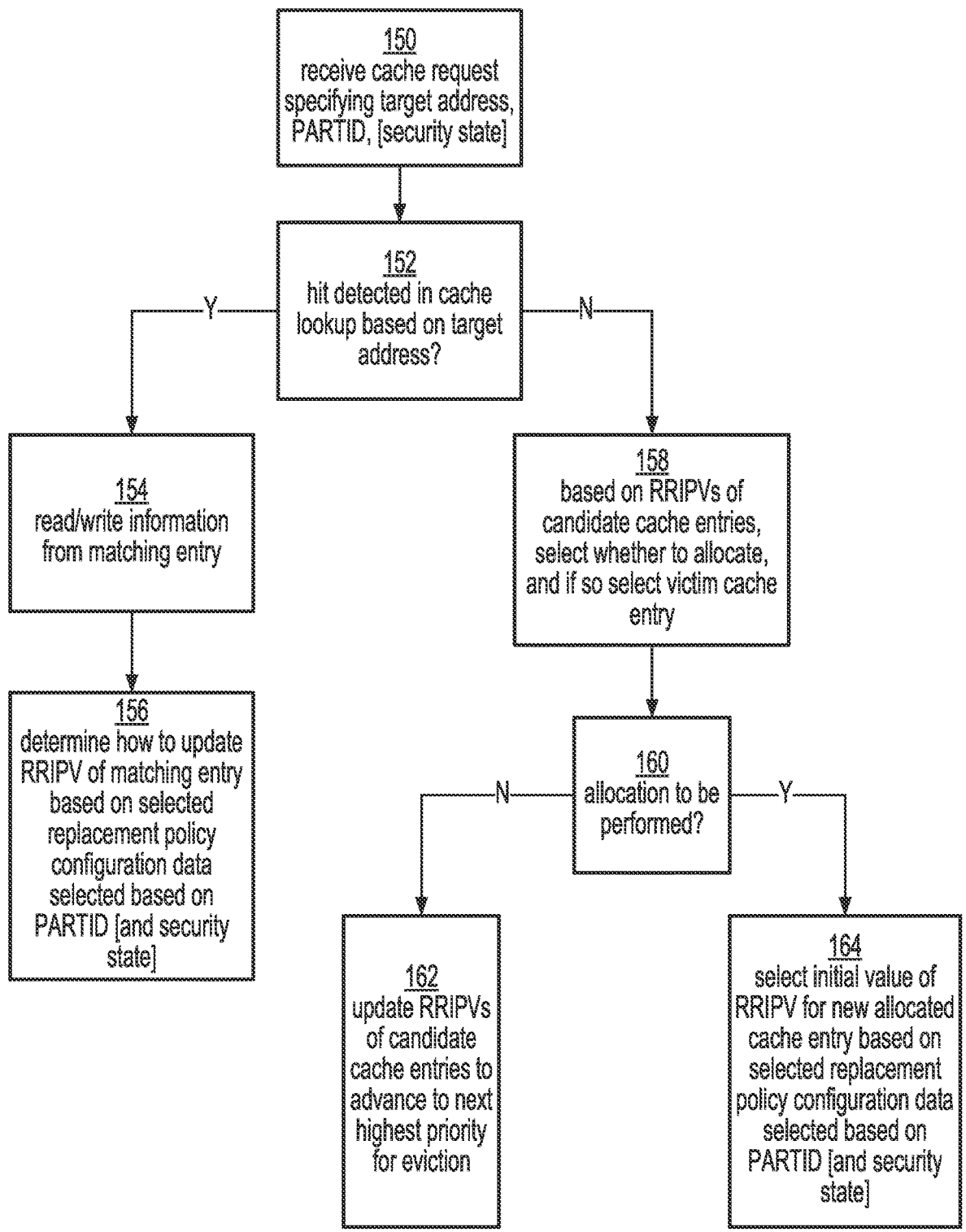
FIG. 7 illustrates an example method for a cache to process the cache request and, in response to a miss in the cache, allocate a new entry based on the RRIP values of candidate cache entries.

FIG. 7 is a flow diagram illustrating a method of processing the cache request received from the requestor. At step 150, the cache 6 receives the cache request issued at step 104 by the requestor. At step 152, the cache 6 determines whether a hit is detected in a lookup of the cache based on the target address (the lookup is independent of the partition identifier, so a hit can be detected even if the matching entry detected in the hit was previously allocated in response to a cache request specifying a different partition identifier to the partition identifier specified in the current request received at step 150).

If a hit is detected in the cache lookup, then at step 154, information is read from, or written to, the matching entry detected in the cache lookup. At step 156 the cache replacement control circuitry 22 determines how to update the RRIP value 38 of the matching entry based on selected replacement policy configuration data 24 selected based on at least the partition identifier (and optionally the security state) specified by the cache request. For example, the control 82 described above may be used to select whether to update the RRIP value 38 of the hit entry according to the FP mode or the HP mode, and/or the control 84 may be used to select the new updated value of the RRIP value 38 of the hit entry when the HP mode is used.

If a miss is detected in the cache lookup, then at step 158, the cache replacement control circuitry 22 selects, based on the RRIP values of two or more candidate cache entries (which are a set of entries selected based on the target address if the cache is a set-associative cache, or comprise all cache entries if the cache is a fully-associative cache), whether to make a new allocation into the cache, and if a new allocation is to be made, which of the candidate cache entries should be the victim entry replaced to make way for the newly allocated entry. This could be controlled in different ways. For some schemes, a new allocation may always be made whenever there is a miss, and so the replacement control circuitry 22 may simply select as a victim entry one of the candidate cache entries which has the RRIP value indicating the greatest priority for eviction among the candidate cache entries. However, for other schemes, a replacement may occur only if at least one of the candidate cache entries has an RRIP value which indicates an eviction priority greater than a threshold (to avoid evicting any information at all, if all the information in the candidate set of entries is indicated as having a relatively low priority for eviction). With the examples of FIGS. 3 and 4, say, the threshold could be RRIPV=2, so that a new allocation is made if at least one of the candidate cache entries has the RRIPV=3, indicating the highest priority for eviction, but otherwise if all of the candidate cache entries have RRIPVs indicating 0, 1, or 2, then no allocation is made. Regardless of whether any RRIPV threshold for eviction is imposed by the replacement policy used, in the case where there is more than one candidate cache entry having RRIPs indicating equal greatest priority for eviction, then various selection schemes may be used to select which of those candidate cache entries is the victim entry. For example, one approach can be to make a random selection among the candidate cache entries sharing the greatest priority for eviction, or to use a round robin approach where it is alternated which way of the cache is selected. However, a straightforward approach to implement can be to select one of the candidate cache entries having the greatest priority for eviction based on the way identifiers of those entries (the way identifier is an identifier distinguishing the candidate cache entries within the same set of a set-associative cache). For example, among those candidate cache entries sharing the greatest priority for eviction, the candidate cache entry with the lowest way identifier could be selected.

Hence, it will be appreciated that there can be a wide variety of ways in which the RRIP values of the candidate cache entries can be used to select a victim.

At step 160, the cache replacement control circuitry 22 determines whether an allocation into the cache is to be performed. If no allocation is to be performed for the current miss in the cache (e.g. because none of the candidate entries had an RRIPV value exceeding the threshold for eviction), then at step 162 the cache replacement control circuitry 22 updates the RRIPVs 38 of the candidate cache entries to advance them to the next highest priority for eviction (e.g. see the transitions marked "miss, no allocation" in FIGS. 3 and 4). For example, a candidate cache entry with RRIPV=0 is advanced to RRIPV=1, a candidate cache entry with RRIPV=1 is advanced to RRIPV=2 and a candidate cache entry with RRIPV=2 is advanced to RRIPV=3 (if the candidate cache entry already had RRIPV=3 then an allocation would have been made, so step 162 would not occur). It will be appreciated that other approaches may use lower RRIPV numbers to indicate higher priority for eviction, in which case the update on a miss with no allocation could be to decrement RRIPVs, rather than increment.

If an allocation into the cache is to be performed, then at step 164 the cache replacement control circuitry 22 selects the initial value of RRIPV for the new allocated cache entry based on selected replacement policy configuration data 24 selected based on at least the partition identifier (and optionally the security state) specified by the cache request. For example, the control setting 80 can be used to specify whether the SRRIP mode (FIG. 3) or BRRIP mode (FIG. 4) is used. If SRRIP mode is used, control setting 86 may set the initial RRIPV to be set for the newly allocated cache entry. If SRRIP mode is used, control settings 88, 90 may set the initial RRIPV to be set for the newly allocated cache entry for the first and other outcomes of the chance-dependent test. Hence, by setting replacement policy configuration data 24, software can influence the RRIP values used based on the needs of the particular software workload being executed.

Figure 8:
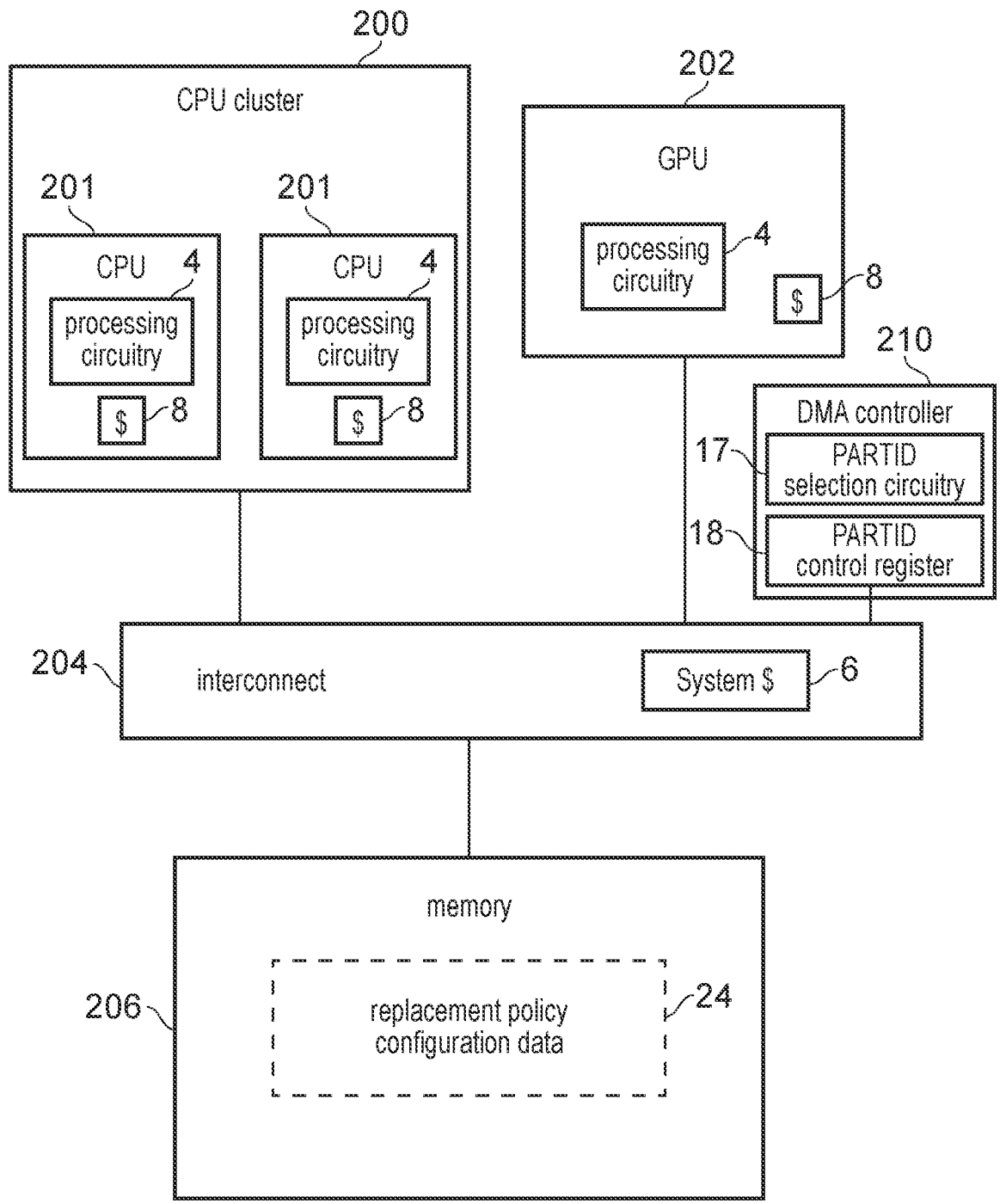
FIG. 8 illustrates an example apparatus where the cache is shared between a CPU (central processing unit) cluster and a GPU (graphics processing unit).

FIG. 8 illustrates an example system in which the techniques above can be applied. The system comprises a CPU (central processing unit) cluster 200 and a GPU 202. This example also has a DMA (direct memory access) controller 210 for performing memory accesses based on configuration data set by software executing on the CPU cluster 200 or GPU 202. It will be appreciated that other processing circuits not shown could also be included (e.g. a neural processing unit (NPU) used for accelerating neural network processing, or other type of hardware accelerator).

The CPU cluster 200 comprises a number of CPUs 201, each CPU 201 having processing circuitry 4 and at least one higher-level (e.g. level 1 and/or level 2) cache 8 as mentioned above. While FIG. 8 shows an example where there are two CPUs 201 in the cluster 200, other examples could only have a single CPU 201 or could have more than two CPUs 201. While FIG. 8 shows a single CPU cluster 200, other examples could have more than one CPU cluster 200. While not shown in the example of FIG. 8, in addition to any caches 8 private to a particular CPU 201, there could also be a further level of cache shared between the CPUs 201 of the cluster 200, but which is not accessible to the GPU 202 or to other CPU clusters.

The GPU 202 also has processing circuitry 4 and at least one cache 8 similar to those mentioned earlier. The architecture and micro-architecture of the processing circuitry 4 in the GPU 202 may differ from the architecture and micro-architecture of the processing circuitry 4 in the CPUs 201—e.g. the GPU may support different instructions and have a different hardware design targeting parallel processing of graphics threads. While FIG. 8 shows a single GPU 202, other examples could have more than one GPU 202.

The CPU cluster 200 and GPU 202 share access to a shared memory system including a shared cache 6. For example, the shared cache 6 can be a system cache which is part of a system interconnect 204 used to manage communications between the CPU cluster 200, GPU 202 and memory 206, or alternatively the shared system cache could be separate from the interconnect 204. The interconnect 204 can be a coherent interconnect which applies a coherency protocol to manage coherency of data cached at the respective caches 8 of the CPU cluster 200 and GPU 202.

The processing circuitry 4 in each CPU 201 and GPU 202 assigns a partition identifier to each outgoing memory access request sent to the interconnect 204, with the partition identifier being selected by partition identifier selection circuitry 17 based on the information stored in the partition identifier control registers 18 as mentioned above. The partition identifier flows through the memory system along with the request, to any memory system node that has resource allocation circuitry for making resource allocation decisions based on the partition identifier. Hence, cache requests made to the system cache 6 also specify the partition identifier that was selected by the one of the CPUs 201 and GPU 202 from which the corresponding memory access request originated. The system cache 6 has cache replacement control circuitry 22 as mentioned earlier, to control cache replacement policy based on the set of replacement policy configuration data 24 associated with the partition identifier specified in the cache request.

The techniques discussed above are particularly useful for a system having at least one CPU and at least one GPU, because typical cache replacement policy schemes used for CPUs do not work well for many GPU workloads and it can be difficult to select a single replacement policy which works well for both CPU accesses and GPU accesses. By labelling cache requests with a partition identifier which can distinguish the GPU traffic from the CPU traffic (as well as distinguishing different workloads executing on a particular CPU 201 or GPU 202), the cache replacement policy can be tailored to the workload associated with the cached data, to improve performance (improving cache hit rates because of the better predictions of which addresses are most likely to be re-referenced again soon).

Accesses from the DMA controller 210 to the system cache 6 can similarly be labelled with partition identifiers selected by partition identifier selection circuitry 17 based on information in at least one partition identifier control register 18, but in the case of the DMA controller 210 (which does not itself execute instructions), the information specified in the partition identifier control registers 18 of the DMA controller 210 is set based on instructions executed by the processing circuitry 4 running on the CPU cluster 200 or GPU 202, rather than on the DMA controller 210 itself. Alternatively, DMA accesses could be assigned a fixed partition identifier selected in hardware, which is not configurable based on the software executed by the CPU cluster 200 or GPU 202.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts.

The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further examples are provided in the following clauses:
1. An apparatus comprising:
   a cache comprising a plurality of cache entries; and
   cache replacement control circuitry to select, in response to a cache request specifying a target address missing in the cache, a victim cache entry to be replaced with a new cache entry, the cache request specifying a partition identifier indicative of an execution environment associated with the cache request; in which:
the cache replacement control circuitry is configured to:
select the victim cache entry based on re-reference interval prediction (RRIP) values for a candidate set of cache entries, the RRIP value for a given cache entry being indicative of a relative priority with which the given cache entry is to be selected as the victim cache entry;
select, based on the partition identifier specified by the cache request, configurable replacement policy configuration data associated with the partition identifier; and
set the RRIP value of the new cache entry to an initial value selected based on the selected configurable replacement policy configuration data associated with the partition identifier.

2. The apparatus according to clause 1, comprising partition identifier selection circuitry to select the partition identifier associated with the cache request based on information specified in at least one register.

3. The apparatus according to clause 2, in which the at least one register is configurable in response to instructions processed by processing circuitry.

4. The apparatus according to any of clauses 1 to 3, comprising a replacement policy configuration data programming interface to program the configurable replacement policy configuration data associated with a given partition identifier in response to instructions processed by processing circuitry.

5. The apparatus according to any of clauses 1 to 4, in which the selected configurable replacement policy configuration data specifies the initial value for the RRIP value of the new cache entry.

6. The apparatus according to any of clauses 1 to 5, in which the selected configurable replacement policy configuration data specifies which of a plurality of RRIP modes to use for selecting the initial value for the RRIP value of the new cache entry.

7. The apparatus according to clause 6, in which the plurality of RRIP modes include:
a static RRIP mode which uses a static initial value for the RRIP value of the new cache entry; and
a bimodal RRIP mode which selects, based on an outcome of a chance-dependent test having a given probability of resulting in a first outcome, a first initial value for the RRIP value of the new cache entry when the chance-dependent test provides the first outcome and a second initial value for the RRIP value of the new cache entry when the chance-dependent test provides the second outcome.

8. The apparatus according to clause 7, in which at least one of the static initial value, the first initial value and the second initial value is configurable based on the selected configurable replacement policy configuration data.

9. The apparatus according to any of clauses 1 to 8, in which the selected configurable replacement policy configuration data specifies whether the cache replacement control circuitry is to select the initial value for the new cache entry based on RRIP information provided by a higher-level cache from which information is capable of being evicted to the cache.

10. The apparatus according to any of clauses 1 to 9, in which, in response to the cache request hitting in a matching cache entry of the cache, the cache replacement control circuitry is configured to determine how to adjust the RRIP value of the matching cache entry based on the selected configurable replacement policy configuration data associated with the partition identifier specified by the cache request.

11. The apparatus according to clause 10, in which, based on the selected configurable replacement policy configuration data associated with the partition identifier specified by the cache request, the cache replacement control circuitry is configured to determine whether to:
set the RRIP value of the matching cache entry to a predetermined value; or
adjust the RRIP value of the matching cache entry from its current value indicating a given priority for selection as the victim cache entry to a next value indicating a next lowest priority for selection as the victim cache entry.

12. The apparatus according to any of clauses 1 to 11, comprising performance monitoring circuitry to maintain a plurality of instances of performance monitoring information associated with respective partition identifiers, a given instance of performance monitoring information for a given partition identifier specifying information indicative of performance detected for the execution environment associated with the given partition identifier.

13. The apparatus according to any of clauses 1 to 12, in which the cache request also specifies a security state identifier indicative of a security state associated with the cache request; and
the cache replacement control circuitry is configured to select the configurable replacement policy configuration data based on the partition identifier and the security state identifier.

14. The apparatus according to any of clauses 1 to 13, in which, in a lookup of the cache based on the target address of the cache request, whether the lookup detects a hit or miss is independent of the partition identifier specified by the cache request.

15. The apparatus according to any of clauses 1 to 14, comprising:
at least one central processing unit; and
at least one graphics processing unit;
where the cache is a shared cache accessible to the at least one central processing unit and also accessible to the at least one graphics processing unit.

16. A method comprising:
in response to a cache request specifying a target address missing in the cache, selecting a victim cache entry to be replaced with a new cache entry, the cache request specifying a partition identifier indicative of an execution environment associated with the cache request, and the victim cache entry being selected based on re-reference interval prediction (RRIP) values for a candidate set of cache entries, the RRIP value for a given cache entry being indicative of a relative priority with which the given cache entry is to be selected as the victim cache entry;
selecting, based on the partition identifier specified by the cache request, configurable replacement policy configuration data associated with the partition identifier; and
setting the RRIP value of the new cache entry to an initial value selected based on the selected configurable replacement policy configuration data associated with the partition identifier.

17. The method of clause 16, comprising selecting the partition identifier associated with the cache request based on information specified in at least one register.

18. The method of claim 17, in which the at least one register is configurable in response to instructions processed by processing circuitry.

19. The method according to any of clauses 16 to 18, comprising programming the configurable replacement policy configuration data associated with a given partition identifier in response to instructions processed by processing circuitry.

20. A non-transitory computer-readable medium to store computer-readable code for fabrication of an apparatus comprising:
a cache comprising a plurality of cache entries; and
cache replacement control circuitry to select, in response to a cache request specifying a target address missing in the cache, a victim cache entry to be replaced with a new cache entry, the cache request specifying a partition identifier indicative of an execution environment associated with the cache request; in which:
the cache replacement control circuitry is configured to:
select the victim cache entry based on re-reference interval prediction (RRIP) values for a candidate set of cache entries, the RRIP value for a given cache entry being indicative of a relative priority with which the given cache entry is to be selected as the victim cache entry;
select, based on the partition identifier specified by the cache request, configurable replacement policy configuration data associated with the partition identifier; and
set the RRIP value of the new cache entry to an initial value selected based on the selected configurable replacement policy configuration data associated with the partition identifier.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
a cache comprising a plurality of cache entries; and
cache replacement control circuitry to select, in response to a cache request specifying a target address missing in the cache, a victim cache entry to be replaced with a new cache entry, the cache request specifying a partition identifier indicative of an execution environment associated with the cache request; in which:
the cache replacement control circuitry is configured to:
select the victim cache entry based on re-reference interval prediction (RRIP) values for a candidate set of cache entries, the RRIP value for a given cache entry being indicative of a relative priority with which the given cache entry is to be selected as the victim cache entry;
select, based on the partition identifier specified by the cache request, configurable replacement policy configuration data associated with the partition identifier, the configurable replacement policy configuration data defining an initial RRIP value to be set for newly allocated cache entries when first allocated; and
set the RRIP value of the new cache entry to the initial RRIP value selected based on the selected configurable replacement policy configuration data selected based on the partition identifier.

2. The apparatus according to claim 1, comprising partition identifier selection circuitry to select the partition identifier associated with the cache request based on information specified in at least one register.

3. The apparatus according to claim 2, in which the at least one register is configurable in response to instructions processed by processing circuitry.

4. The apparatus according to claim 1, comprising a replacement policy configuration data programming interface to program the configurable replacement policy configuration data associated with a given partition identifier in response to instructions processed by processing circuitry.

5. The apparatus according to claim 1, in which the selected configurable replacement policy configuration data specifies the initial RRIP value of the new cache entry.

6. The apparatus according to claim 1, in which the selected configurable replacement policy configuration data specifies which of a plurality of RRIP modes to use for selecting the initial RRIP value of the new cache entry.

7. The apparatus according to claim 6, in which the plurality of RRIP modes include:
a static RRIP mode which uses a static initial value for the initial RRIP value of the new cache entry; and
a bimodal RRIP mode which selects, based on an outcome of a chance-dependent test having a given probability of resulting in a first outcome, a first initial value for the initial RRIP value of the new cache entry when the chance-dependent test provides the first outcome and a second initial value for the RRIP value of the new cache entry when the chance-dependent test provides the second outcome.

8. The apparatus according to claim 7, in which at least one of the static initial value, the first initial value and the second initial value is configurable based on the selected configurable replacement policy configuration data.

9. The apparatus according to claim 1, in which the selected configurable replacement policy configuration data specifies whether the cache replacement control circuitry is to select the initial RRIP value for the new cache entry based on RRIP information provided by a higher-level cache from which information is capable of being evicted to the cache.

10. The apparatus according to claim 1, in which, in response to the cache request hitting in a matching cache entry of the cache, the cache replacement control circuitry is configured to determine how to adjust the RRIP value of the matching cache entry based on the selected configurable replacement policy configuration data associated with the partition identifier specified by the cache request.

11. The apparatus according to claim 10, in which, based on the selected configurable replacement policy configuration data associated with the partition identifier specified by the cache request, the cache replacement control circuitry is configured to determine whether to:

set the RRIP value of the matching cache entry to a predetermined value; or adjust the RRIP value of the matching cache entry from its current value indicating a given priority for selection as the victim cache entry to a next value indicating a next lowest priority for selection as the victim cache entry.

12. The apparatus according to claim 1, comprising performance monitoring circuitry to maintain a plurality of instances of performance monitoring information associated with respective partition identifiers, a given instance of performance monitoring information for a given partition identifier specifying information indicative of performance detected for the execution environment associated with the given partition identifier.

13. The apparatus according to claim 1, in which the cache request also specifies a security state identifier indicative of a security state associated with the cache request; and the cache replacement control circuitry is configured to select the configurable replacement policy configuration data based on the partition identifier and the security state identifier.

14. The apparatus according to claim 1, in which, in a lookup of the cache based on the target address of the cache request, whether the lookup detects a hit or miss is independent of the partition identifier specified by the cache request.

15. The apparatus according to claim 1, comprising:
at least one central processing unit; and
at least one graphics processing unit;
where the cache is a shared cache accessible to the at least one central processing unit and also accessible to the at least one graphics processing unit.

16. A method comprising:
in response to a cache request specifying a target address missing in the cache, selecting a victim cache entry to be replaced with a new cache entry, the cache request specifying a partition identifier indicative of an execution environment associated with the cache request, and the victim cache entry being selected based on re-reference interval prediction (RRIP) values for a candidate set of cache entries, the RRIP value for a given cache entry being indicative of a relative priority with which the given cache entry is to be selected as the victim cache entry;
selecting, based on the partition identifier specified by the cache request, configurable replacement policy configuration data associated with the partition identifier, the configurable replacement policy configuration data defining an initial RRIP value to be set for the newly allocated cache entries when first allocated; and
setting the RRIP value of the new cache entry to the initial RRIP value selected based on the selected configurable replacement policy configuration data selected based on the partition identifier.

17. The method of claim 16, comprising selecting the partition identifier associated with the cache request based on information specified in at least one register.

18. The method of claim 17, in which the at least one register is configurable in response to instructions processed by processing circuitry.

19. The method according to claim 16, comprising programming the configurable replacement policy configuration data associated with a given partition identifier in response to instructions processed by the processing circuitry.

20. A non-transitory computer-readable medium to store computer-readable code for fabrication of an apparatus comprising:
a cache comprising a plurality of cache entries; and
cache replacement control circuitry to select, in response to a cache request specifying a target address missing in the cache, a victim cache entry to be replaced with a new cache entry, the cache request specifying a partition identifier indicative of an execution environment associated with the cache request; in which:
the cache replacement control circuitry is configured to:
select the victim cache entry based on re-reference interval prediction (RRIP) values for a candidate set of cache entries, the RRIP value for a given cache entry being indicative of a relative priority with which the given cache entry is to be selected as the victim cache entry;
select, based on the partition identifier specified by the cache request, configurable replacement policy configuration data associated with the partition identifier, the configurable replacement policy configuration data defining an initial RRIP value to be set for the newly allocated cache entries when first allocated; and
set the RRIP value of the new cache entry to the initial RRIP value selected based on the selected configurable replacement policy configuration data selected based on the partition identifier.

* * * * *